United States Patent [19]

Wallgren et al.

[11] Patent Number: 4,458,504
[45] Date of Patent: Jul. 10, 1984

[54] ABSORPTION REFRIGERATING APPARATUS

[75] Inventors: Sonny O. Wallgren, Ekerö; Eva K. Haegerstrand, Sollentuna; Bengt R. Reistad, Bromma, all of Sweden

[73] Assignee: Aktiebolaget Electrolux, Stockholm, Sweden

[21] Appl. No.: 448,607

[22] Filed: Dec. 10, 1982

[30] Foreign Application Priority Data

Jan. 8, 1982 [SE] Sweden .............................. 8200062

[51] Int. Cl.³ .............................................. F25B 15/10
[52] U.S. Cl. ........................................ 62/490; 62/110
[58] Field of Search .................................. 62/110, 490

[56] References Cited

U.S. PATENT DOCUMENTS 2,156,908  5/1939  Babcock ............................ 62/110 X
2,240,176  4/1941  Coons et al. ...................... 62/110 X
2,561,369  7/1951  Hellstrom .......................... 62/110

Primary Examiner—Lloyd L. King
Attorney, Agent, or Firm—Alfred E. Miller

[57] ABSTRACT

This invention relates to an arrangement in an absorption refrigerating apparatus, which operates with a pressure equalizing gas, and is provided with at least two absorbers. A height difference occurs between the liquid level in the standpipe of the boiler and the inlet level of the absorbers in order to supply absorption solution which is weak and refrigerant to the absorbers. At least a major part of the supply conduit is replaced by branch conduits, each one of which has a flow resistance which is at least double the difference between the flow resistances in said branch conduits.

7 Claims, 2 Drawing Figures

ABSORPTION REFRIGERATING APPARATUS

This invention relates to an arrangement in an absorption refrigerating apparatus, which is tolerant to inclination, operates with a pressure-equalizing gas and has at least two coil-type absorbers, a difference in height, when the apparatus is in horizontal position, between the liquid level in the standpipe of the boiler and the inlet level of the absorbers being in known manner dependent on the difference in temperature between the warm absorption solution flowing in the standpipe downwards to the liquid heat exchanger of the apparatus and the absorption solution which is colder and flows upwards in a supply conduit from the liquid heat exchanger to the absorber inlets.

The capacity of an absorption refrigerating apparatus depends largely on the absorbing efficiency of its absorber. This efficiency depends on several factors, such as the concentration of refrigerant in the gas and the liquid, the cooling of the absorber and to a large extent on the length of the pipe coil. The space available for accommodating an absorber is limited in height. Further the absorber pipe must have a given inclination so that the refrigerating apparatus will be tolerant to inclination. In refrigerating apparatus for mobile use, for example in caravans, there is a high demand for tolerance to inclination and this makes it difficult to build an absorber of the desired capacity for such an apparatus. On the other hand there is generally space for at least one additional coiled absorber so that the pipe length could be doubled.

Already in the 1930-ies the use of a double absorber for obtaining an increase of the capacity or the efficiency was contemplated. It appears from the patent literature, however, that the difficulties in practical application could not be overcome. In the U.S. Pat. No. 1,908,901 it is proposed to use a double absorber together with a boiler system including two pumps and entirely separated flow paths for weak solution from the boiler to the absorbers. This may be an applicable solution to the problem but the boiler construction becomes too complex and expensive.

The U.S. Pat. No. 2,066,660 contains a proposal according to which weak solution from the boiler is conducted to a vessel between the absorbers. Supply conduits for liquid to the absorbers enter into the vessel and above the liquid level therein. Above the conduits and extending down into the liquid there are provided wicks or the like which have capillary action and through which the liquid would be sucked from the vessel to the conduits. Generally, this proposal is unreliable because the wicks may clog by impurities in the liquid, and it cannot be used in apparatus which are tolerant to inclination since the capillary lifting force is extremely small and inclinations will affect the distribution of liquid to a high extent.

Another way of solving the problem is proposed in the U.S. Pat. No. 2,302,091. Weak absorption solution is conducted through a conduit to a vessel positioned above the inlet level of the absorbers. From the vessel goes a conduit to each absorber. The openings of the conduits inside the vessel have each a cover in the shape of a cap with an orifice through which the solution is meant to drip into the conduit. To obtain the desired effect the dimensions of the orifices must be extremely small. Practical experience, however, shows that it is not possible to use so small orifices in an absorption refrigerating apparatus. This is so because the liquid in the absorption refrigerating apparatus is not entirely free from impurities in the form of solid bodies which easily can block these small orifices and jeopardize the operation of the apparatus.

Still another proposal is presented in the U.S. Pat. No. 2,298,029. Also here the weak solution is conducted through a conduit to a vessel above the inlet level. This vessel communicates with the two absorbers by two short conduits. The patent specification says that the inner diameters of these conduits are chosen so that the conduits are filled with liquid during operation of the refrigerating system, thereby tending to equalize the supply of liquid to the two absorbers even if the system should be positioned such that the conduits are not perfectly horizontal. That not even this proposal is satisfying appears clearly from the fact that the invention defined in the patent specification in general comprises two conduits which cross each other and extend between the absorbers and through which the uneven liquid distribution is to be equalized to a certain extent.

It is evident that previously it seemed to be attractive to use two absorbers but that this has not been practically applied to apparatus for mobile use due to the difficulty in dividing the flow of liquid into equal parts and to make this flow independent of the inclination of the apparatus within the fixed limits of tolerance.

An object of the present invention is to provide an arrangement by which the desired distribution of liquid to at least two absorbers can be performed and which is safe in operation during the whole life of the apparatus. This problem can be solved according to the invention in that at least the major part of the supply conduit is replaced by branch conduits 29 and 30, each one with a flow resistance which is at least double the difference in flow resistance between the conduits 29 and 30.

The invention will be described in the following with reference to an absorption refrigerating apparatus with two absorbers as shown in the drawings.

Figure 1:
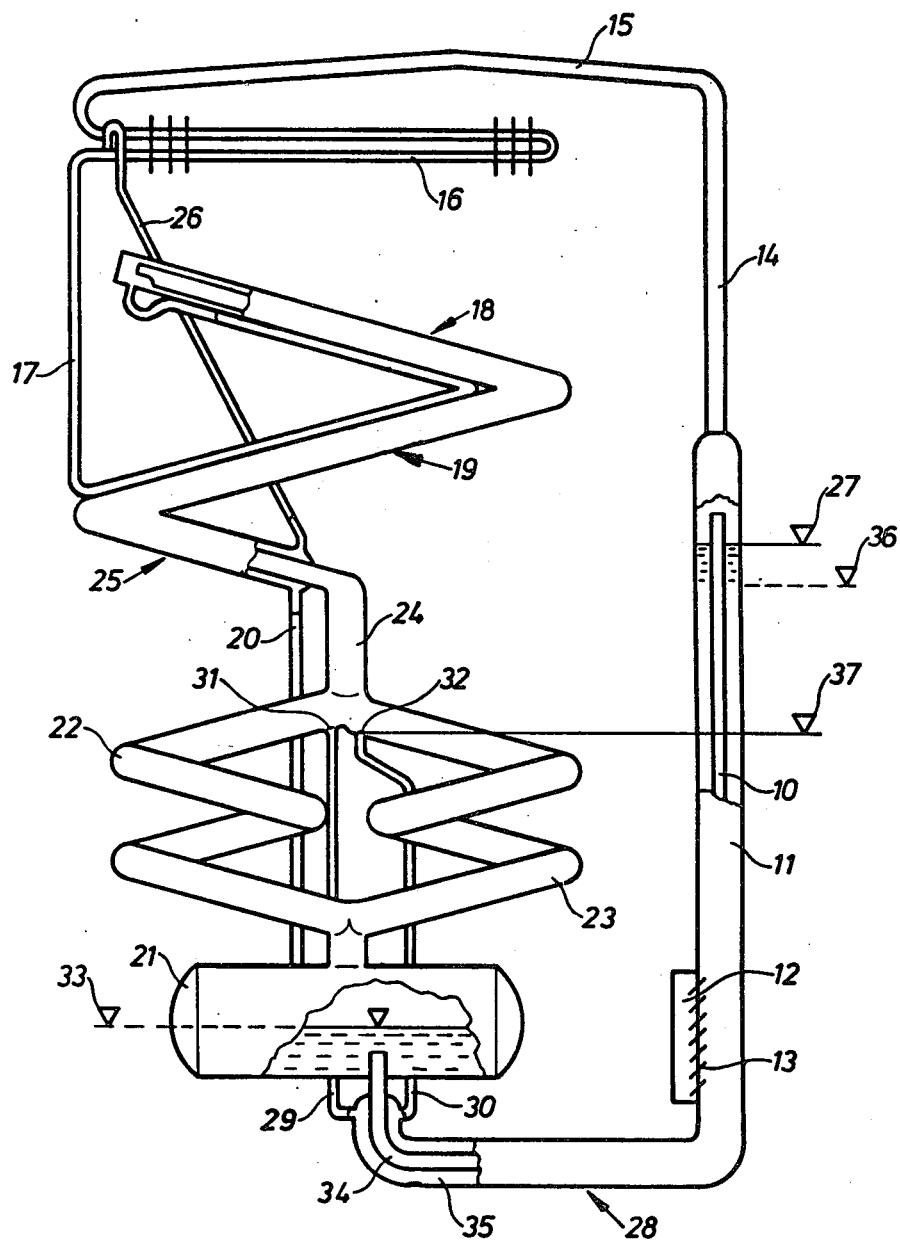
FIG. 1 is a diagrammatic illustration of the apparatus.

The absorption refrigerating apparatus shown in FIG. 1 is intended to operate with refrigerant, absorption solution and a pressure-equalizing inert gas, for example ammonia, water, and hydrogen gas. However also other working media can be used. The apparatus has a so-called single-pipe boiler, i.e. the boiler system contains two concentric pipes, viz. an inner pump pipe 10 and an outer standpipe 11. Heat is supplied to the boiler system by an electric heating cartridge in a sleeve 12. Heat is transferred by way of a weld joint 13 between the sleeve 12 and the pipe 11. A vapour conduit 14 goes from the boiler system to a water separator 15 and the condenser 16 of the apparatus. A condensate conduit 17 extends from the condenser 16 to the evaporator system 18, 19 of the apparatus. From this system goes a conduit 20 for the gas and the refrigerant vapours to the absorber vessel 21 of the apparatus and further through two absorbers 22, 23, arranged in parallel, and a conduit 24 back to the upper part of the evaporator system.

The gas conduits 20 and 24 are in known manner heat-conductively interconnected in a gas heat exchanger 25. The condenser 16 is vented to the gas heat exchanger by a conduit 26.

Refrigerant vapours are expelled in the boiler system and the solution, weak in refrigerant, thus formed is transferred by the pump 10 to the surrounding standpipe 11 in which thus a level 27 is maintained. The absorption solution, weak in refrigerant, in the standpipe 11 is in known manner conducted through the liquid heat exchanger 28 of the apparatus through its outer conduit. Already under the absorber vessel 21 this flow of liquid is divided into two parallel branch conduits 29, 30 through which the weak absorption solution is led up to liquid inlets 31, 32 of the two absorbers 22, 23. The branch conduits 29, 30 issue from the liquid heat exchanger 28.

In the absorber vessel 21, absorption solution, rich in refrigerant and coming from the absorbers 22, 23 is collected on a liquid level 33. Through an inner conduit 34 of the liquid heat exchanger 28 the solution is conducted to the boiler in which refrigerant vapours are expelled and the solution, which is then weak, is lifted by the pump 10 to the level 27. In a corresponding refrigerating apparatus having only one absorber and a normal supply conduit for weak solution from the outer conduit 35 of the exchanger 28, the liquid in the standpipe 11 would stop at a level 36 because liquid supplied by the pump 10 would flow over from the supply conduit in the absorber at a level 37. According to the invention there is created in each supplu conduit 29, 30 a flow resistance which is a function of the length and the diameter of the pipe. The two conduits have equal inner diameter and are of equal length. The flow resistance in the branch conduits cause the liquid level in the standpipe 11 to rise from the level 36 to the level 27. This difference in height is suitably about 20-30 mm. Such a flow resistance is achieved according to the invention in the conduits 29, 30 by making them with an inner diameter of about 2 mm and a length of about 60 cm. Suitable dimensions of the conduits can be determined by calculation or by testing. For reliable operation of the apparatus the inner diameter should be greater than 1 mm. With such dimensions of the pipes there is no risk of breaks in operation at this place in the apparatus.

Figure 2:
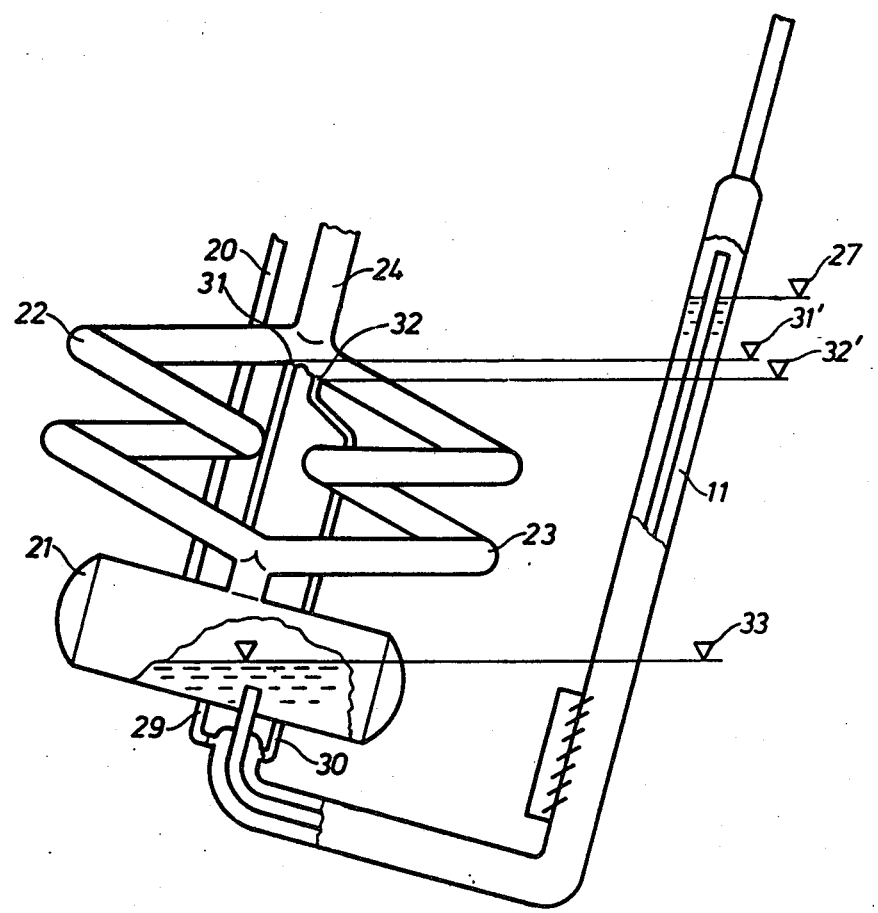
FIG. 2 is a corresponding illustration of the liquid circulation system of the same apparatus when inclined.

FIG. 2 shows what happens when the apparatus is largely inclined in a vertical plane through boiler and absorber. There will be two different inlet levels 31', 32' to the absorbers with a certain difference in height. If each conduit 29, 30 has been designed for a pressure reduction so great that the liquid level in the standpipe 11 has been lifted from the level 36 to the level 27 with a difference in height of about 20 mm and the inlet points 31, 32 have been positioned close to each other, a difference in height between them of perhaps 5 mm will be obtained, which is so much smaller than the difference in height in the boiler pipe that the liquid flow in the supply conduits 29, 30 is only insignificantly affected. More liquid will flow through the absorber 23 than in the other absorber 22 because the inlet of the first-mentioned absorber is situated on a lower level. However, the difference is so small that in practice it is of no importance for the operation of the apparatus.

In the Figures, the inlets 31, 32 of the supply conduits 29, 30 to the absorbers are shown well separated in order to clearly show the difference between the levels 31' and 32' in an inclined apparatus. In practice, however, the two inlet points can be positioned closer to each other. If a small upwards extending partition is placed between the inlet points these can be arranged practically adjacent one another and in that case the difference in height on inclination will be almost imperceptible.

We claim:

1. An absorption refrigerating apparatus having a pressure equalizing gas and at least two absorbers comprising: a pair of branch conduits each having an inlet to a respective absorber, a boiler provided with a chamber, said inlets having absorption solution weak in refrigerant therein communicating through said branch conduits with said chamber, said absorption solution being collected in said chamber to a predetermined level from which said absorption solution is applied to said inlets, the difference in height between said predetermined level in said chamber and the level of said inlets being the only source for forcing the absorption solution to said inlets, and said branch conduits being throttled whereby said absorption solution is introduced into all said absorbers through at least one of said inlets, even if said inlets are not positioned at the same height level.

2. An absorption refrigerating apparatus as claimed in claim 1 wherein the flow resistance in each of said branch conduits as a result of said throttling is at least double the difference in pressure height between the inlets, when said inlets are positioned at different levels.

3. An arrangement as claimed in claim 1 wherein said branch conduits are fabricated of pipes of substantially equal inner diameter and equal length.

4. An arrangement as claimed in claim 3 wherein the pipes of said branch conduits have an inner diameter which is larger than 1 mm.

5. An arrangement as claimed in claim 1 wherein the length of said branch conduits is at least as great as the height of said absorbers.

6. An arrangement as claimed in claim 5 wherein said apparatus is provided with a liquid heat exchanger and said branch conduits extend from said liquid heat exchanger to the inlets to the absorbers.

7. An arrangement as claimed in claim 1 further comprising an upwardly extending partition arranged between said inlets to said absorbers.

* * * * *